(No Model.) 2 Sheets—Sheet 1.
W. G. CALDERWOOD & D. W. EDWARDS.
PROPELLING DEVICE FOR BICYCLES.
No. 590,492. Patented Sept. 21, 1897.
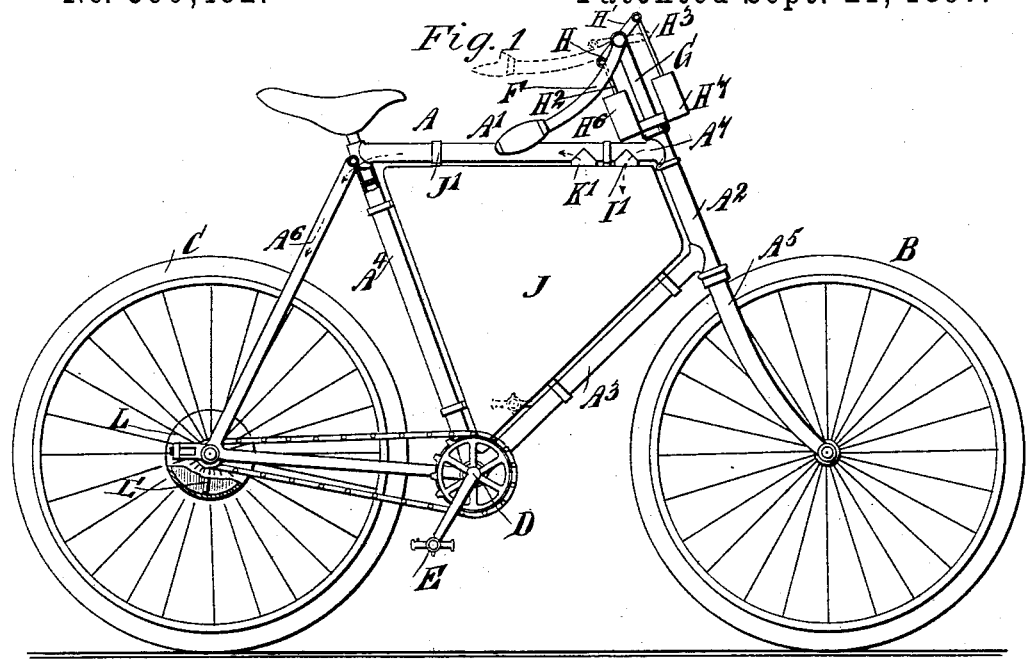
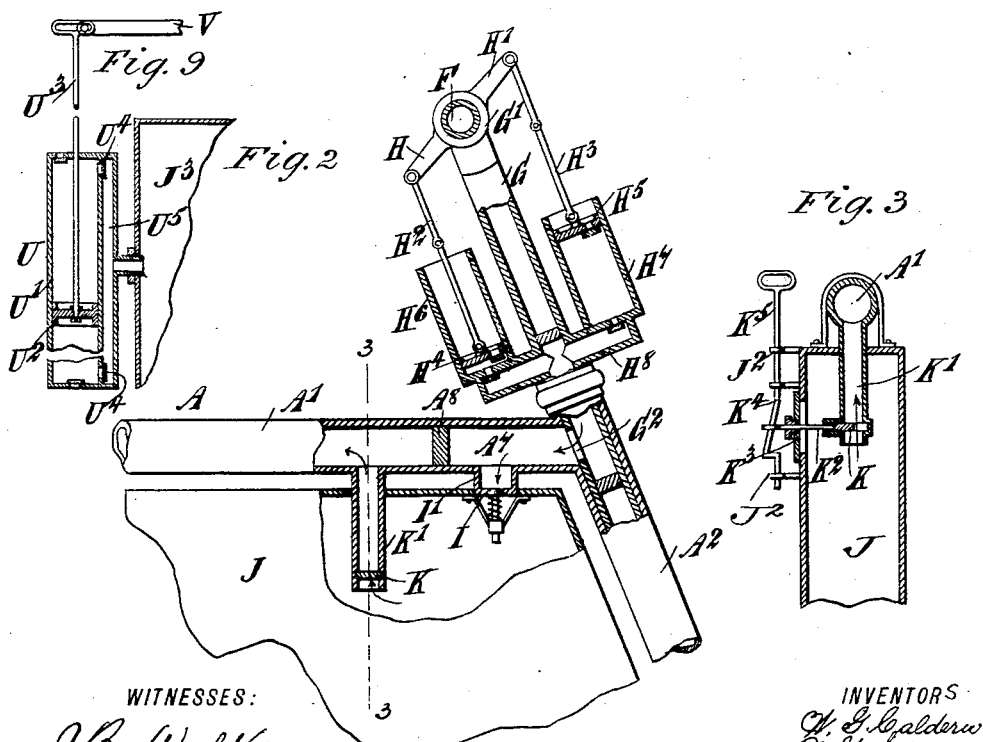
WITNESSES:
J. B. Walker
Theo. G. Hoster
INVENTORS
W. G. Calderwood
D. W. Edwards
BY
Munn
ATTORNEYS
THE NORRIS PETERS CO., PHOTO-LITHO., WASHINGTON, D. C.

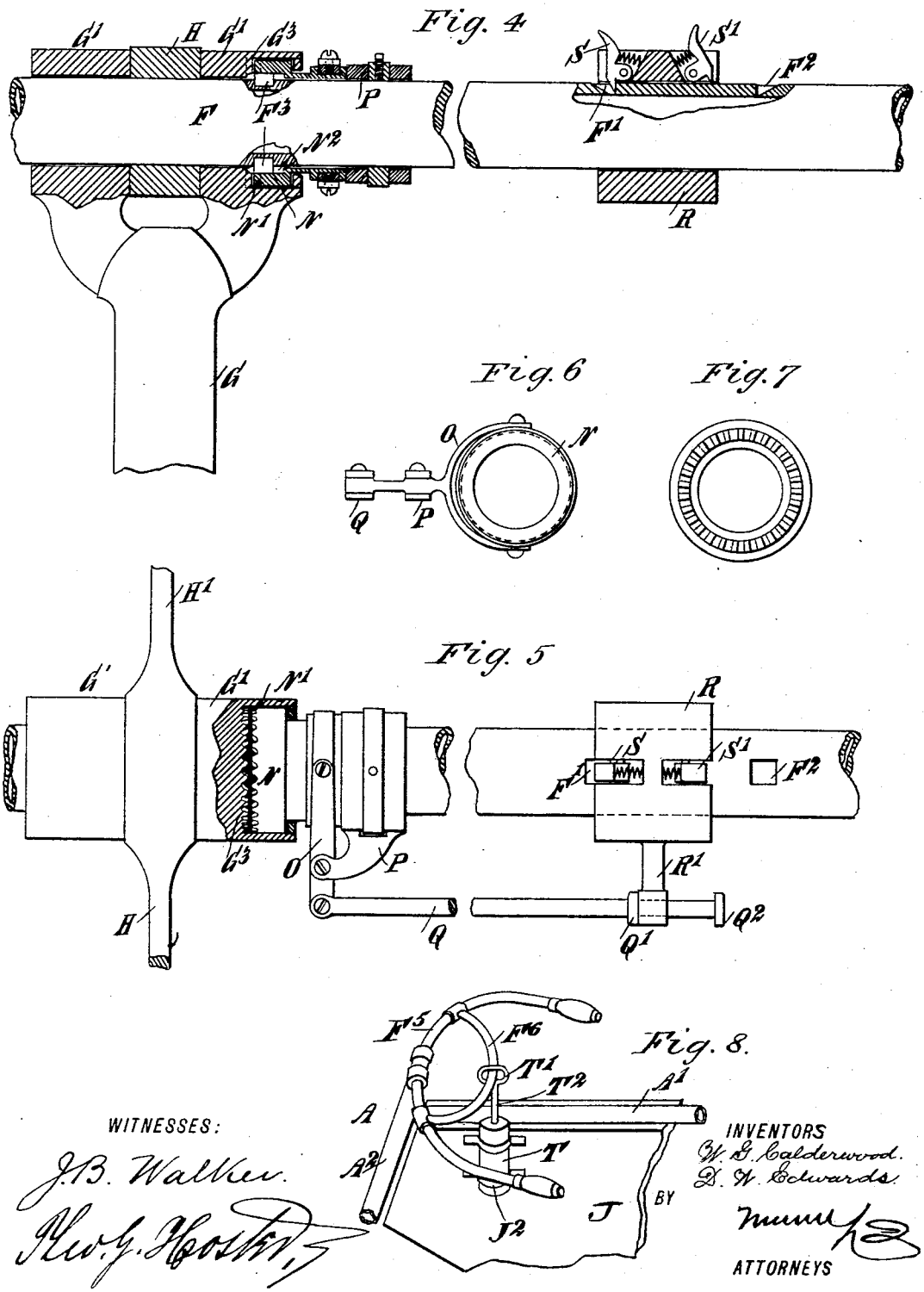

UNITED STATES PATENT OFFICE.

WILLIS G. CALDERWOOD, OF MINNEAPOLIS, MINNESOTA, AND DAVID W. EDWARDS, OF LOS ANGELES, CALIFORNIA.

PROPELLING DEVICE FOR BICYCLES.

SPECIFICATION forming part of Letters Patent No. 590,492, dated September 21, 1897.

Application filed January 30, 1896. Serial No. 577,363. (No model.)

*To all whom it may concern:*

Be it known that we, WILLIS G. CALDERWOOD, of Minneapolis, in the county of Hennepin and State of Minnesota, and DAVID W. EDWARDS, of Los Angeles, in the county of Los Angeles and State of California, have invented a new and Improved Propelling Device for Bicycles, of which the following is a full, clear, and exact description.

The object of the invention is to provide a new and improved propelling device for bicycles and like vehicles and which is simple and durable in construction, very effective in operation, and arranged to enable the operator to develop and store compressed air for use in driving a motor to assist in propelling the vehicle.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a side elevation of the improvement. Fig. 2 is an enlarged sectional side elevation of the pump part of the frame and reservoir. Fig. 3 is a transverse section of the reservoir on the line 3 3 of Fig. 2. Fig. 4 is an enlarged sectional side elevation of the locking device of the handle-bar as applied. Fig. 5 is a plan view of the same with parts in section. Fig. 6 is an end view of the clutch-sleeve. Fig. 7 is a face view of the same. Fig. 8 is a perspective view of a modified form of the improvement, and Fig. 9 is a sectional side elevation of another modified form of the improvement.

The bicycle or like vehicle on which the propelling device is applied is provided with the usual frame A, a front steering-wheel B, and a driving-wheel C, connected in the usual manner by a sprocket-chain and sprocket-wheels with the pedal-shaft D, carrying the usual pedals E, adapted to be actuated by the rider to propel the vehicle forward. The front wheel B is steered by the handle-bar F, mounted to turn at its middle in bearings G' of the handle-bar stem G, and the said handle-bar, besides being used for steering the vehicle, is utilized for actuating an air-pump of any approved construction. This pump may be provided with two single-acting cylinders and plungers, as shown in Figs. 1 and 2, or provided with a double-acting cylinder, as illustrated in Figs. 8 and 9. In the construction shown in Figs. 1 and 2 the handle-bar F is provided on the middle portion between the bearings G' with the arms H H', extending in opposite directions and pivotally connected at their outer ends with plunger-rods $H^2$ $H^3$, respectively carrying plungers $H^4$ $H^5$, respectively fitted to slide in the pump-cylinders $H^6$ $H^7$, respectively supported on the handle-bar stem G, as plainly indicated in Fig. 2.

The lower ends of the cylinders $H^6$ $H^7$ are connected by valves with a discharge-pipe $H^8$, opening into the lower hollow portion of the handle-bar stem G, the latter being connected near its lower closed end by a port $G^2$ with the forward end of the upper brace A' of the frame A.

The frame A, as shown in the drawings, is provided with the usual steering-head $A^2$, lower brace $A^3$, center brace $A^4$, front fork $A^5$, and rear upper brace $A^6$. The said parts are preferably made of tubing, so that the port $G^2$ opens into the forward end $A^7$ of the upper brace A', the latter being divided into compartments by a partition $A^8$, as indicated in Fig. 2. This forward end of the upper brace A' is connected by a branch pipe I', containing a spring-pressed valve I, with the interior of a compressed-air reservoir J between the bicycle-frame parts A', $A^2$, $A^3$, and $A^4$, and secured thereto by suitable straps or like devices J' to securely hold the air-reservoir in place. A branch pipe K' leads from the interior of the air-reservoir J to the rear of the upper brace A', as plainly shown in Fig. 2, and in this branch pipe K' is arranged a valve K, adapted to open and close said branch pipe to permit compressed air to pass from the reservoir into the rear end of the upper brace A' or to disconnect said parts.

The slide-valve K is provided with a transversely-extending stem $K^2$, passing through a suitable stuffing-box $K^3$ on one side of the reservoir J, (see Fig. 3,) and the outer end of the stem $K^2$ is connected with the crank-arm $K^4$ of a vertically-disposed shaft $K^5$, journaled in suitable bearings $J^2$, attached to the reservoir J. The handle end of the shaft $K^5$ is under the control of the rider, so that on turning the shaft $K^5$ the valve K is opened or closed to permit compressed air to pass to the rear end of the upper brace A' or to cut off the air, as desired. The compressed air in the reservoir J is utilized as a motive agent for driving a motor L, preferably attached to the driving-wheel C to rotate the latter. The rotating part of the motor shown in the drawings is provided with wings or blades L', adapted to be acted on by the compressed air, it being, however, understood that said motor may be of any approved construction and may be connected with the pedal-shaft D or other running part of the vehicle.

The rear end of the upper brace A' is connected with the upper end of a rear upper brace $A^6$, having one forked arm hollow for carrying compressed air to the motor L. In case the latter is attached to the pedal-shaft D, then the center brace $A^4$ is made use of to carry the compressed air to the motor from the reservoir J.

Now it will be seen that the rider in swinging the handle-bar F up and down causes the arms H H' to reciprocate the plungers $H^4$ $H^5$ in the pump-cylinders $H^6$ $H^7$, so that air is pumped into the outlet $H^8$, the compressed air passing from the latter into the handle-bar stem G, and by the port $G^2$ thereof into the forward end $A^7$, and through the branch pipe I' and spring-pressed valve I into the reservoir J. Compressed air is thus stored in the air-reservoir J.

When it is desired to aid the rider or to propel the vehicle without the operator turning the pedal-shaft D, then he turns the shaft $K^5$ so as to open the valve K and permit compressed air from the reservoir J to pass to the motor L, so as to actuate the latter and propel the vehicle forward. It is understood that the handle-bar F is used in the usual manner for steering the front wheel B, but the rider can also swing the handle-bar up or down to actuate the air-pump and fill the reservoir J with compressed air. The handle-bar F can be locked to one of the bearings G' to prevent swinging of the handle-bar for actuating the pump, and for this purpose we provide the device shown in Figs. 4, 5, 6, and 7.

The bearing G' in question is formed with clutch-teeth $G^3$, adapted to be engaged by similar teeth N', held on a sleeve N, fitted to slide on the handle-bar F, as is plainly shown in Figs. 4 and 5. Keys $F^3$, secured on the handle-bar F, engage grooves in the sleeve N and cause the sleeve to turn with the handle-bar; but when the sleeve with its clutch-teeth N' is in engagement with the clutch-teeth $G^3$ of the bearing G' then the handle-bar and bearing are locked together and a turning of the handle-bar is prevented.

By reference to Fig. 1 it will be seen that the handle-bars are shown down, as in the lower part of the stroke given in the act of pumping. They may be locked in this position by the device shown in Figs. 4, 5, 6, and 7. The dotted lines in Fig. 1 show the handle-bars up, as at the top of the upper stroke given in the act of pumping. They may also be locked in this position by the device above referred to, or they may be locked in any intermediate position to suit the taste of the rider.

In order to shift the sleeve N on the handle-bar, we connect said sleeve with a shifting fork O, fulcrumed on a bracket P, adjustably held on the handle-bar F, said shifting fork being pivotally connected with a rod Q, provided on its outer end with two collars Q' $Q^2$, between which is arranged a bearing R', secured on a collar R, adjustably held on the handle-bar F and adapted to be secured thereto by two spring-catches S S', adapted to engage notches F' $F^2$, respectively formed on said handle-bar.

When the device is in the position shown in Figs. 4 and 5, the sleeve N is not in engagement with the bearings G', and consequently the handle-bar F can be turned to manipulate the air-pump, as previously explained. When it is desired to lock the handle-bar in place on the bearings G', then the rider takes hold of the spring-catch S, presses the same to move it out of engagement with the notch F', and then shifts the collar R to the right until the other catch S' snaps into the notch $F^2$. In shifting the collar R the bearing R' moves against and pushes the collar $Q^2$, so as to shift the rod Q to the right. This movement causes a swinging of the shifting fork O, whereby the sleeve N is moved to the left, so that the clutch-teeth N' move in engagement with the clutch-teeth $G^3$ on the bearing G'. The handle-bar F is thus locked to the bearing. For unlocking the two parts the collar R is shifted back to its former position, so as to push the rod Q to the left of the sleeve N out of engagement with the clutch-teeth on the bearing G'.

Now it will be seen that the device is very simple and durable in construction, and the operator can at any time actuate the handle-bar to work the air-pump and fill the reservoir J with compressed air, which can be utilized whenever desired for actuating the motor L and propelling the vehicle forward.

In the arrangement shown in Fig. 8 the handle-bar $F^5$ is provided with a segmental arm $F^6$, engaging the elongated aperture T' in the upper end of the plunger-rod $T^2$ of the double-acting pump T, secured to one side of the reservoir $J^2$. Now it will be seen that the operator can turn the handle-bar to steer the vehicle, and he can also swing it up and down to actuate the pump T for filling the reservoir $J^2$, which latter has a direct valve connection with the pump-cylinder.

In the double-acting pump U (shown in Fig. 9) the cylinder U' is provided with a plunger U², having its valve-stem U³ connected with a lever V, receiving an up-and-down swinging motion from the handle-bar. The upper and lower valved ends of the cylinder U' are also provided with valve connections U⁴, with a channel U⁵ opening into the interior of the reservoir J³, so that the pump when actuated fills the reservoir J³ with air.

Having thus fully described our invention, we claim as new and desire to secure by Letters Patent—

1. A propelling device for vehicles, comprising a motor connected with the driving-gear of the vehicle, a compressed-air reservoir held in the frame of the vehicle, the said reservoir furnishing compressed air to said motor for driving the same, a pump connected with said reservoir for filling the same with compressed air, and a handle-bar for steering the said vehicle, the said handle-bar being axially pivoted, whereby it may be swung up and down and connected with the pump to operate the same, substantially as shown and described.

2. The combination with a bicycle or like vehicle having its frame provided with tubular portions, of a propelling device, comprising a motor connected with the driving-gear of the vehicle, a compressed-air reservoir carried by the vehicle, and connected by means of the tubular frame parts with said motor, whereby the compressed air passes from the reservoir to the motor, means for controlling the passage of air from the reservoir to the motor, a pump connected with said reservoir for filling the same with compressed air, and a handle-bar for steering the said vehicle, the said handle-bar being mounted to turn in suitable bearings, whereby it may have an up-and-down movement, the plunger of said pump being connected with and adapted to be actuated from the handle-bar, substantially as described.

3. A propelling device for bicycles, comprising a motor connected with the driving-gear of the vehicle, a compressed-air reservoir held in the vehicle-frame and furnishing compressed air for driving said motor, the said reservoir being provided with a valve-controlled outlet, a pump connected with said reservoir for filling the same with compressed air, a handle-bar mounted to swing up and down and connected with the plunger-rod of the said pump for actuating the same, and mechanism connected with the outlet-valve of the reservoir for manipulating the same, the said mechanism being under the control of the rider, substantially as specified.

4. The combination with a bicycle provided with a frame having tubular parts, of a propelling device for said bicycle, comprising a motor connected with the driving-gear of the bicycle, a compressed-air reservoir held in the bicycle-frame and having an inlet for the air, a valved outlet-pipe connecting said reservoir with the tubular parts of the frame to carry the compressed air to the said motor, a pump connected with the inlet of said reservoir for filling the same with compressed air, a handle-bar connected with the handle-bar stem for steering said vehicle, the said handle-bar being mounted to swing up and down in bearings on said stem, a connection between said handle-bar and the plunger rod or rods of the pump to actuate the same, and mechanism connected with the outlet-valve of the reservoir for manipulating the same, the said mechanism being under the control of the rider, substantially as specified.

5. The combination with a bicycle, of a motor connected with the driving-gear for the bicycle, a compressed-air reservoir held in the bicycle-frame and furnishing compressed air for driving said motor, a pump for supplying said reservoir with compressed air, a slide-valve for controlling the outlet from said reservoir and provided with a transversely-extending stem passing through a stuffing-box in the side of the reservoir, and a vertically-disposed shaft provided with a handle and under the control of the operator, the said shaft having a crank-arm connected with the stem of the said slide-valve, substantially as shown and described.

6. The combination with a bicycle, of a motor connected with the driving-gear for the bicycle, a compressed-air reservoir held in the bicycle-frame below the upper brace, the said upper brace being made hollow and provided with a partition near its forward end, an inlet-pipe provided with a valve and connecting the forward end of the upper brace with the said reservoir, a valved outlet-pipe connecting the interior of the reservoir with the upper brace at the rear of the said partition, the rear portion of said upper brace being connected through the hollow frame parts with the said motor, a handle-bar stem having its lower hollow portion connected by a port with the forward portion of the upper brace, a pump operated from the handle-bar, a discharge-pipe connecting the pump-cylinder with the hollow portion of the handle-bar stem, and a mechanism for manipulating the valve in the outlet of said reservoir, substantially as set forth.

7. The combination with a handle-bar, and the stem in which said handle-bar is mounted to turn, of a locking device for locking the said handle-bar in any desired position on the stem, the said device, comprising clutch-teeth on the said stem, a clutch-sleeve mounted to slide on said handle-bar and adapted to engage said clutch-teeth, and a collar adjustable on the handle-bar and adapted to be locked thereto, the said collar being operatively connected with the said clutch-sleeve, substantially as described.

8. The combination with the handle-bar, and the stem in which said handle-bar is mounted to turn, of a device for fastening said handle-bar to said stem, said device, comprising a clutch-sleeve fitted to slide on said handle-bar, and adapted to engage clutch-teeth on the said stem, a shifting lever for said sleeve, a rod connected with said lever, and a collar having spring-catches and adjustably held on the said handle-bar, said collar being adapted to push said rod, substantially as shown and described.

9. The combination with the handle-bar, and the stem in which said handle-bar is mounted to turn, of a device for fastening said handle-bar to the stem, said device comprising a clutch-sleeve fitted to slide on said handle-bar and adapted to engage clutch-teeth on the said stem, a bracket adjustably held on the handle-bar, a shifting lever for said sleeve fulcrumed on said bracket, a rod pivotally connected with said shifting lever and provided with collars at its outer end, and a collar having spring-catches and adjustably held on the said handle-bar, the said collar being provided with a bearing arranged between the collars on the said rod and adapted to push said rod, substantially as described.

WILLIS G. CALDERWOOD.
DAVID W. EDWARDS.

Witnesses to the signature of Willis G. Calderwood:
JNO. W. LEEDY,
NORMAN J. COX.

Witnesses to the signature of David W. Edwards:
MATTIE J. EDWARDS,
J. H. BLAGG.